United States Patent

Sidline

[15] 3,641,504

[45] Feb. 8, 1972

[54] APPARATUS FOR TRANSPORTING A RECORDING MEDIUM FOR STORING INFORMATION

[72] Inventor: George B. Sidline, Belmont, Calif.

[73] Assignee: Ampex Corporation, Redwood City, Calif.

[22] Filed: Feb. 20, 1969

[21] Appl. No.: 801,100

[52] U.S. Cl. ....................340/172.5

[51] Int. Cl. ....................G11b 13/00

[58] Field of Search ....................340/172.5, 174.1; 235/157, 235/61.115

[56] References Cited

UNITED STATES PATENTS

| | | | |
|---|---|---|---|
| 3,400,374 | 9/1968 | Schumann | 340/172.5 |
| 3,403,386 | 9/1968 | Perkins | 340/172.5 |
| 3,435,314 | 3/1969 | Bradley | 340/174.1 X |

OTHER PUBLICATIONS

Bradley, Programmers Guide to the IBM System 360, 1969, pp. 33–53 and 90–99

*Primary Examiner*—Paul J. Henon
*Assistant Examiner*—R. F. Chapuran
*Attorney*—Robert G. Clay

[57] ABSTRACT

A preset counter counts pulses received from a tachometer as a magnetic tape is transported to position a particular storage address on the tape at a selected location relative to a magnetic head. The pulse count is representative of the distance that the particular storage address must be transported to position it at the selected location. The counter is coupled to the motor drive circuit of the tape transport mechanism to control the speed of the tape movement in accordance with the count stored in the counter. As the particular storage address is transported to position it at the selected location, the counter issues signals while its count is in predetermined ranges of its counting sequence corresponding to predetermined ranges of distances that the particular storage address must be transported to position it at the selected location. The signals issued by the counter are coupled to change the motor drive signal incrementally whereby the tape is accelerated and decelerated according to the transport's acceleration characteristic in positioning the storage address.

8 Claims, 8 Drawing Figures

INVENTOR.
GEORGE B. SIDLINE

BY Robert G. Clay

ATTORNEY

INVENTOR.
GEORGE B. SIDLINE

BY Robert G. Clay

ATTORNEY

INVENTOR.
GEORGE B. SIDLINE

BY Robert S. Clay

ATTORNEY

INVENTOR
GEORGE B. SIDLINE
BY Robert G. Clay
ATTORNEY

APPARATUS FOR TRANSPORTING A RECORDING MEDIUM FOR STORING INFORMATION

BACKGROUND OF THE INVENTION

The present invention relates to positioning a transported recording medium for storing information and, more particularly, to positioning a transported recording medium by adjusting the recording medium's transport drive signal.

Many large capacity information storage systems employ a transported recording medium for storing information in the form of either a recorded reproduction or a recorded representation of the original information. In these storage systems, the recording medium is carried by a transport mechanism which is operated to position particular storage addresses on the recording medium relative to suitable means for transferring information between the recording medium and information processing means. The apparatus of the present invention is particularly useful for positioning magnetic tapes employed in document storage and retrieval systems to store television images of documents. Hence, the description of this invention will be explained in connection with positioning magnetic tapes relative to magnetic heads which transfer the information between the tapes and suitable record and reproduce electronic systems which process the information. However, it will be understood by those skilled in the art that the apparatus of this invention will be equally useful in connection with positioning other recording media as well as in connection with recording media employed for purposes other than document storage and retrieval. For example, the apparatus of this invention can be employed to position other forms of magnetic recording media, such as, discs, drums, and wires; photographic image recording media, such as, microfilm; heat sensitive recording media, such as, thermoplastic materials; and light sensitive recording media such as those used in conjunction with laser beams. Also, the positioning of recording media employed with electronic editors to interleave separately recorded television program material and of those employed in data handling systems, such as instrumentation recording systems, can be controlled by the apparatus of this invention.

The speed of information storage systems depends upon how quickly the information transferring means can enter information into and retrieve information from storage. One factor that limits the speed of entering information at and retrieving information from a particular storage address of the recording medium is the time required to transport the recording medium to position the particular storage address for access by the means for entering or retrieving the information therefrom.

In document storage and retrieval systems in which television signal images of the documents are recorded on a magnetic tape, the television image of a document is recorded on a single frame of the tape. To facilitate the accurate reproduction of the television image signals while not unduly limiting the speed of the system, the tape is transported at one velocity, usually 5 inches per second (5 i.p.s.), while television image signals are being recorded on or reproduced from the tape. However, when transporting the tape to position a particular storage address or frame thereof for access by the magnetic head, which frame is remotely located from the frame presently positioned for access by the head, the tape is transported at much higher velocities, for example, up to 380 i.p.s. However, the television image signals will not be faithfully reproduced if they are reproduced on or recovered from the tape while it is being transported at the higher velocities. Hence, the tape must be decelerated to the lower velocity for recording or reproducing the television image signals. Since the tape transport mechanism has considerable inertia, the tape velocity can not be changed instantaneously. Hence, a length of tape will be transported during a speed change interval. The length of tape transported during speed change intervals depends upon the beginning and final velocities, and may vary enough each time a speed change is made between the same beginning and final velocities to cause errors in recording or reproducing a frame of information.

To insure the proper recording and reproducing of television images, steps must be taken to assure that the tape velocity is reduced to the lower velocity of 5 i.p.s. when the desired frame is positioned at the selected location for access by the magnetic head. Heretofore, it has been the practice to employ one of two techniques to reduce the tape velocity. In some cases, the tape is transported at the higher velocity of 380 i.p.s. until the particular frame passes the selected location for access by the magnetic heads. At this time, the transport of the tape is stopped and reversed in direction at 5 i.p.s. until the magnetic heads have transduced the information from or on the tape. This requires the transportation of a considerable length of tape at the show velocity of 5 i.p.s. in order to complete the transduction of information from or on the tape. This results in an undesirably slow information storage system.

To overcome this limitation on the speed of the system, the tape may be accelerated after it is brought to a stop from the high velocity of 380 i.p.s. until the velocity of the tape reaches that which intersects the acceleration characteristic of the transport. At this time, alternate forward and transport direction commands are generated and issued in rapid succession to the tape transport to cause the tape to be decelerated according to the transport's acceleration characteristic. This causes the velocity of the tape to be reduced so that the particular frame is positioned at the selected location for access by the magnetic heads. This technique requires sophisticated circuitry for rapidly generating and issuing the alternate forward and reverse commands to the tape transport. Furthermore, the rapid reversing of the direction of tape transport places an unnecessary strain on the tape transport mechanism.

Considerable advantage is therefore to be gained by controlling the velocity of a transported recording medium to rapidly transport it to position a particular storage address thereof at a selected location relative to the means for transferring information between the recording medium and an information processing means. Additional advantages are to be gained in controlling the velocity of the transported recording medium by changing its velocity so that the recording medium is transported in one direction as it is decelerated.

SUMMARY OF THE INVENTION

Accordingly, it is an object of this invention to reduce the time required to position a particular storage address of a transported recording medium at a selected location relative to means for transferring information between the recording medium and an information processing means.

More particularly, it is an object of this invention to position a particular storage address of a transported recording medium at a selected location by only decreasing the record medium's transport drive signal during the deceleration of the recording medium so that the recording medium is transported in one direction as it is accelerated and decelerated in positioning the storage address at the selected location.

Furthermore, it is an object of this invention to position a particular storage address of a transported recording medium at a selected location by incrementally decreasing the recording medium's transport drive signal to decelerate the recording medium so that the particular storage address is transported at least the distance necessary to position it at the selected location.

A further object of this invention is to provide a technique of rapidly positioning a transported recording medium which is relatively insensitive to changes in the acceleration characteristic of the recording medium's transport.

According to the present invention, the acceleration characteristic of a recording medium's transport mechanism is used as a guide in controlling the acceleration and deceleration of a transported recording medium to position a particular storage address thereof at a selected location. The acceleration characteristic determines how quickly the transport mechanism can change the velocity at which the recording medium is being transported. Usually, it is expressed in terms of inches/second/second and is depicted graphically as a plot of the velocity of the recording medium as a function of the distance that a particular location on the recording medium must move or the time required for it to reach the desired velocity. Each transport mechanism has a particular acceleration characteristic. While the acceleration characteristic of any transport mechanism tends to remain unchanged, it will change if the transport mechanism or associated prime mover system malfunctions or as a result of normal wear and tear.

To position a particular storage address of a transported recording medium at a selected location remote from its present location, the recording medium's transport drive signal is incrementally changed as the storage address reaches positions which are predetermined distances from the selected location defining the limits of predetermined ranges of distances. The drive signal is changed to command the transport mechanism to transport the recording medium at smaller selected velocities while the particular storage address is at positions which are within the predetermined ranges of shorter distances from the selected location. Preferably, the predetermined distance positions at which the transport drive signal is changed are selected according to the acceleration characteristic of the recording medium's transport so that the recording medium is transported in one direction as the particular storages address is transported towards the selected location. When the particular storage address reaches the selected location, a command is generated to stop the transportation of the recording medium.

As discussed hereinbefore, the distance that a particular storage address is transported after initiating a speed change before the commanded velocity is attained may vary each time a speed change is made between the same beginning and final velocities. The variation is on the order of a few percent of the average distance that the particular storage address must be transported before the recording medium attains the final velocity. Therefore, if the recording medium's velocity is low enough, e.g., in the case of magnetic recording 5 i.p.s., when the transport mechanism is commanded to stop the transportation of the recording medium, the distance variation can be tolerated.

To assure that the particular storage address of the recording medium will be positioned at the selected location when the transport mechanism is commanded to stop the transportation of the recording medium under normal operating conditions, the distance location at which the final transport drive signal change is initiated is a distance from the location which allows the recording medium's velocity to reach a velocity before the address reaches the selected location from which the recording medium can be brought to a stop to position the address at the selected location. By changing the transport drive signal as described above, the recording medium will be transported in one direction as it is decelerated to position a particular storage address at a selected location. Furthermore, by selecting the predetermined distance locations at which the transport drive signal changes are initiated so that the square of the velocity of the recording medium at each of the times when a change is initiated as well as that during the interval between changes divided by two times the distance that the particular storage address is from the selected location always equals the acceleration characteristic of the transport mechanism, the particular storage address will be transported to the selected location in the optimum minimum time.

BRIEF DESCRIPTION OF THE DRAWINGS

The foregoing as well as other objects and advantages of the present invention will become more apparent upon the consideration of the following detailed description and claims together with the accompanying drawings of which:

Referring to FIG. 1, one embodiment of the apparatus of the present invention 28 is illustrated. The apparatus 28 comprises a setable preset counter 30 which accumulates counts indicative of the distance that a particular storage address 22 of the tape 24 must be transported to position it at a selected location 32 relative to the magnetic head 26.

Figure 1:
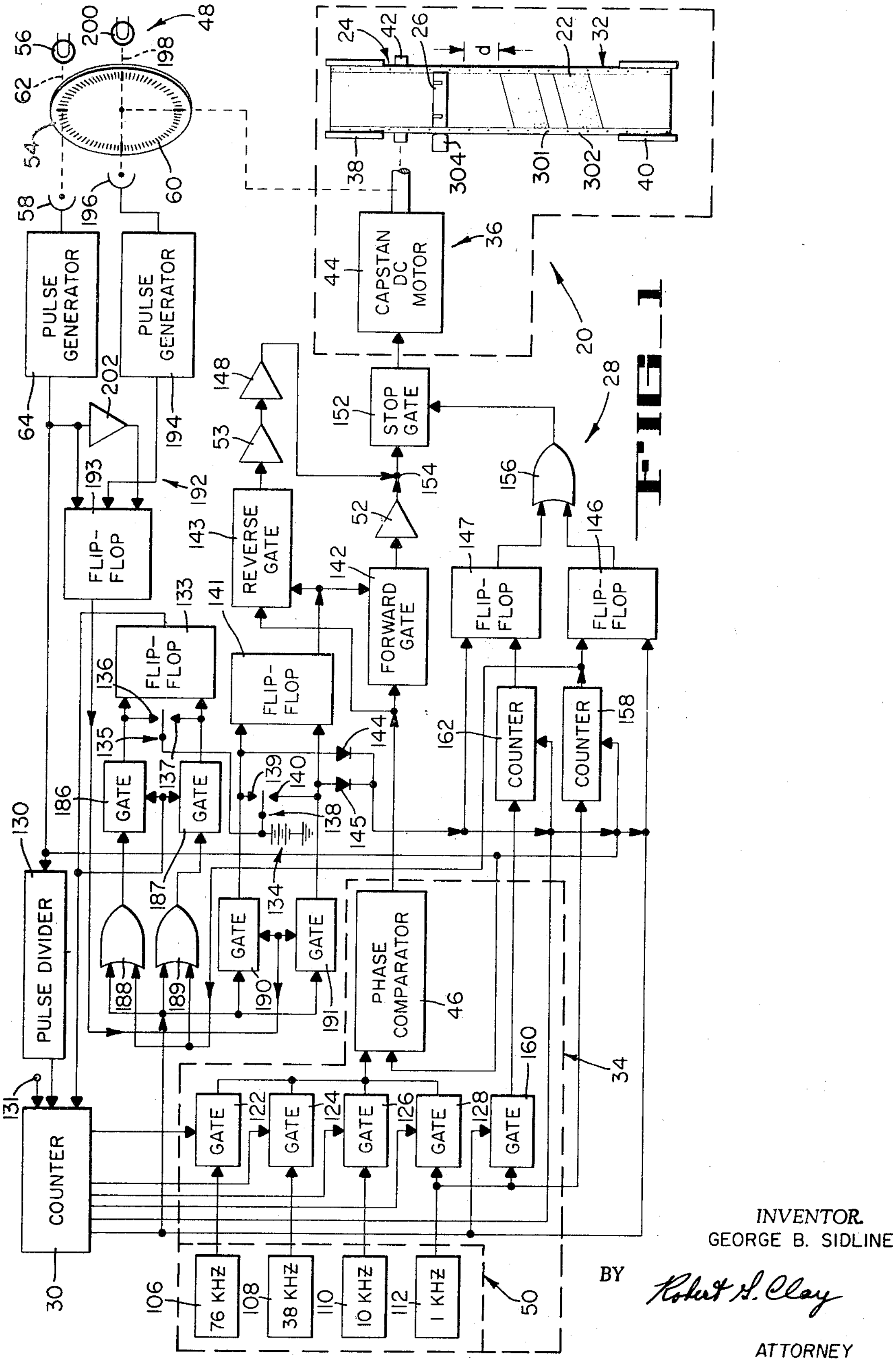
FIG. 1 is a schematic block diagram of apparatus for positioning a transported recording medium in accordance with the present invention.

For recording and reproducing television signals, a rotating head drum assembly is often used as the magnetic head 26 for recording and reproducing the signals. The details of the rotating head drum assembly and the record and reproduce electronics systems have not been shown inasmuch as references may be made to widely published literature for an understanding of the details. It is sufficient to state that each of four magnetic heads are symmetrically placed about the circumference of the head drum and are energized from a common signal source during recording. The magnetic heads provide separate signals which are combined by switching during reproduction.

As the counter 30 reaches preset counts in the counting sequence, signals are issued which alter the drive signal provided by an adjustable drive signal generator 34 to the transport mechanism's prime mover 36. The counter 30 is arranged so that each preset count in the counting sequence corresponds to a different predetermined distance, *d*, that the particular storage address 22 is from the selected location 32. The adjustable drive signal generator 34 is coupled in circuit connection with the preset counter 30 to have its drive signal changed to effect a change in the velocity at which the transport mechanism transports the tape 24 when the count in the preset counter 30 attains predetermined preset counts in the counting sequence. In this manner, the counter 30 controls the transport mechanism's drive signal in accordance with the distance related count it accumulates, thereby functioning as a distance determining device.

In the particular embodiment illustrated in FIG. 1, a magnetic tape 24, commonly used to carry television image information and having a width of 2 inches and a length of 4,000 feet, is moved between a supply reel 38 and a takeup reel 40 associated with a standard transport mechanism 20. In one embodiment constructed, a transport mechanism including a capstan 42 and a capstan motor 44 was employed which was manufactured by the Ampex Corporation of 401 Broadway, Redwood City, California, designated as model number 6200052, and had an acceleration characteristic of 224 inches per second per second. The magnetic tape 24 is moved between the reels 38 and 40 under the control of the rotating capstan 42 driven by its prime mover 36. The prime mover 36 includes a reversible multiple speed type DC motor 44 powered by drive signals provided by the adjustable drive signal generator 34 to rotate the capstan 42. The DC motor 44 rotates the capstan 42 to cause the tape 24 to be transported at a velocity and in a direction determined by the distance that the particular storage address 22 must be transported to position it at the selected location 32, and the position of the storage address 22 relative to the location 32, i.e., on the supply reel or takeup reel side of the location 32.

The capstan motor's drive signal is generated by a comparator 46 which compares a signal representative of the motor's speed provided by a tachometer 48 with a reference signal provided by an adjustable reference source 50. The capstan motor 44, tachometer 48, adjustable reference source 50 and comparator 46 form a capstan servo loop which automatically effects a change in the capstan motor's drive signal when the reference signal and tachometer signal are not equal, e.g., as occurs when the reference signal is changed or the capstan speed changes. The output of the comparator 46 is constant when the tachometer and reference signals are equal. When the speed of the capstan motor increases or decreases, or the reference signal is changed, the output of the comparator 46 varies in a manner that compensates for the change. The output of the comparator 46 is amplified by either the forward or reverse motor drive amplifiers 52 and 53 and is coupled to drive the capstan motor 44.

The tachometer 48 employed in one embodiment constructed in accordance with the present invention is the type widely used in magnetic tape recording systems including a precision, etched-glass disc or timing wheel 54 rotating between a light source 56 and a photocell 58. The timing wheel is mechanically coupled to the capstan DC motor 44 to be synchronously driven with the capstan 42. As the timing wheel 54 rotates, the photocell 58 detects the timing marks 60 etched in the glass as they pass through the light beam 62 projected by the light source 56. The output of the photocell 58 is coupled to a pulse generator 64 which provides a pulse of a precise width each time a mark 60 is detected, e.g., 200 pulses per inch of tape 24 that is transported. The pulses provided by the pulse generator 64 are coupled to one input of the digital comparator 46.

Figure 2:
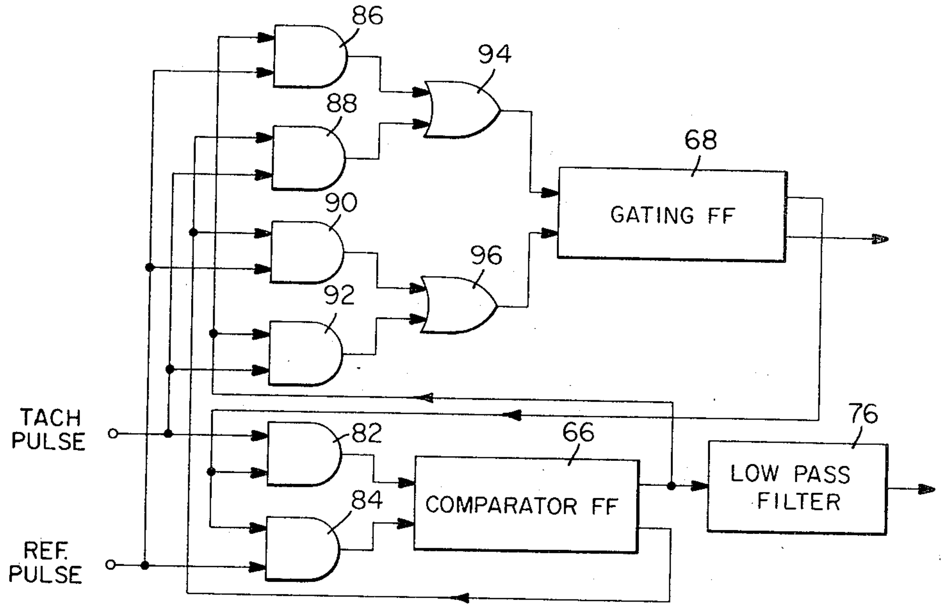
FIG. 2 is a schematic diagram of the phase comparator employed in the apparatus of FIG. 1.
Figure 3:
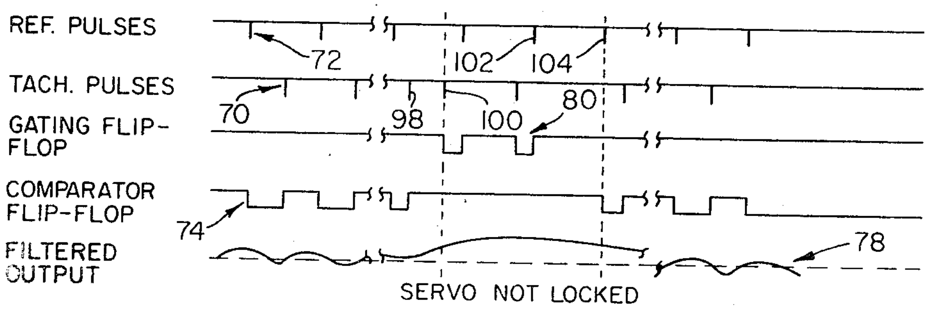
FIG. 3 illustrates waveforms depicting the operation of the phase comparator of FIG. 2.

A phase-type comparator 46 is used to generate the motor drive signal by comparing the time, hence, phase, relationship of the pulses provided by the tachometer 48 and the pulses provided by a pulse-type reference source 50. The details and operation of the phase comparator 46 are shown in FIGS. 2 and 3. The comparison is accomplished by a comparator flip-flop 66 and a gating flip-flop 68 interconnected by logic circuits so that as long as the tachometer and reference pulses 70 and 72 (See FIG. 4) alternate at the input of the comparator 46, the comparator flip-flop 66 changes state with each pulse while the gating flip-flop 68 remains locked in one state. This the the servo-locked condition. If the tachometer and reference pulses 70 and 72 are exactly 180° apart, the output of the comparator flip-flop 66 is a square wave 74 which, after filtering by the low pass filter 76, becomes a zero error DC voltage signal 78. Variations in the time relation, hence, phase between the two pulses signals 70 and 72 produce variations in the symmetry of the output wave 74 of the comparator flip-flop 66 and corresponding variations in the filtered output voltage signal 78.

If two or more tachometer pulses 70 or two or more reference pulses 72 arrive in succession at the input of the phase comparator 46, the phase comparator 46 goes into a servo-unlocked condition. The second of the successive pulses gates the gating flip-flop 68 to its second state which causes the comparator flip-flop 66 to be locked in one of its conduction states. The servo-locked condition is restored when two similar pulses of opposite kind that triggered the unlocked condition arrive in succession at the input of the phase comparator 46. During the servo-unlocked condition, alternate tachometer and reference pulses 70 and 72 change the state of the gating flip-flop 68 while the conduction state of the comparator flip-flop 66 remains unchanged. This condition is illustrated by waveform 80. The output of the comparator flip-flop 66 while in the servo-unlocked condition is a steady output of a polarity dependent upon which kind of similar pulses arrived in succession to trigger the unlocked condition. FIG. 3 illustrates the case of two successive tachometer pulses 70 arriving at the input of the phase comparator 46 to lock the comparator flip-flop 66 in a conduction state which provides a steady positive output. This occurs when the speed of the capstan 42 is greater than that corresponding to the frequency of the reference pulses 72. If the speed of the capstan 42 is less than that corresponding to the frequency of the reference pulses 72, two reference pulses 72 arriving in succession at the input of the phase comparator 46 will lock the comparator flip-flop 66 in the second of its conduction states which provides a steady negative output.

The logic circuit interconnecting the comparator and gating flip-flops 66 and 68 to provide the described operation includes two AND-gates 82 and 84 operatively associated with the comparator flip-flop 66, and four AND-gates 86, 88, 90 and 92 and two OR-gates 94 and 96 operatively associated with the gating flip-flop 68. The outputs of the AND-gates 82 and 84 are coupled to the inputs of the two sections of the comparator flip-flop 66 so that a pulse passed by the AND-gate 82 causes the comparator flip-flop 66 to make a transition from one state to the other opposite that caused by a pulse passed by the AND-gate 84. The AND-gate 82 receives the tachometer pulses 70 from the pulse generator 64 at one of its inputs. The AND-gate 84 is coupled to the adjustable reference source 50 to receive the reference pulses 72 at one of its inputs. The second inputs of both of the AND-gates 82 and 84 are coupled to the output of one of the sections of the gating flip-flop 68 so that they alternately pass the tachometer and reference pulses 70 and 72 as long as the gating flip-flop 68 is locked in the conduction state corresponding to the servo-locked condition.

To control the servo condition of the gating flip-flop 68, AND-gates 86 and 88 receive the reference and tachometer pulses 72 and 70 respectively, and gating pulses from the sections of the comparator flip-flop 66 responsive to the other of the reference and tachometer pulses 72 and 70. Hence, AND-gate 86 is coupled to the section of the comparator flip-flop 66 responsive to the tachometer pulse 70 and AND-gate 88 is coupled to the other section which is responsive to the reference pulse 72. The outputs of the AND-gates 86 and 88 are coupled to the input of the OR-gate 94. The OR-gate 94 is coupled to the input of the section of the gating flip-flop 68 which is conducting while the gating flip-flop is in the servo-locked condition.

The AND-gates 90 and 92 receive the reference and tachometer pulses 72 and 70 respectively, and gating pulses from the sections of the comparator flip-flop 66 responsive to the identical pulses 72 and 70. The outputs of the AND-gates 90 and 92 are coupled to the input of the OR-gate 96. The OR-gate 96 is coupled to the input of the section of the gating flip-flop 68 which is conducting while the gating flip-flop is in the servo-unlocked condition.

With this arrangement of AND and OR gates, once the gating flip-flop 68 is in the servo-locked condition, the AND-gates 82 and 84 will be gated on by the gating flip-flop to allow each of the alternate tachometer and reference pulses 70 and 72 to change the state of the comparator flip-flop 66. However, the AND-gates 90 and 92 are inhibited by the comparator flip-flop 66. This prevents the gating flip-flop 68 from changing state, hence, it remains in the servo-locked condition. Although AND-gates 86 and 88 are gated by the comparator flip-flop 66 to allow alternate tachometer and reference pulses 70 and 72 to cause the OR-gate 94 to issue pulses to the input of the gating flip-flop 68, these pulses have no effect since they are coupled to the section of the gating flip-flop which is in the conducting state.

When two identical pulses, for example, tachometer pulses 98 and 100, arrive in succession at the input of the phase comparator 46, the second pulse 100 cannot change the state of the comparator flip-flop 66 since its section responsive to the tachometer pulses 70 is in the conducting state. However, the AND-gate 92 is gated by the conducting section of the comparator flip-flop 66 responsive to the tachometer pulses 70 to allow the tachometer pulse 100 to cause the OR-gate 96 to issue a pulse which sets the gating flip-flop 68 to its other servo-unlocked conducting state. Alternate tachometer and reference pulses 70 and 72 now are coupled to the OR-gates 94 and 96 by the AND-gates 92 and 86 operatively associated with the section of the comparator flip-flop 66 locked in its conducting state. The OR-gates 94 and 96 respond to the pulses to cause the gating flip-flop 68 to change alternately its state. The state of the comparator flip-flop 66 remains unchanged because the gating pulse provided to the AND-gates 82 and 84 by the gating flip-flop is removed each time the reference pulses 72 are present. This condition remains unchanged until two successive pulses of the opposite kind that triggered the servo-unlocked condition, in the example given, reference pulses 102 and 104, arrive at the input of the phase comparator 46. The second reference pulse 104 has no effect on the conducting state of gating flip-flop 68. But, since the gating pulse provided to the AND-gate 84 by the gating flip-flop 68 is present, the second reference pulse 104 causes a change in the state of the comparator flip-flop 66. The phase comparator 46 is now in the servo-locked condition and alternate tachometer and reference pulses 70 and 72 are able to cause the comparator flip-flop to change state while the gating flip-flop 68 remains locked in the state corresponding to the servo-locked condition.

In the case of two successive reference pulses 72 arriving at the input of the phase comparator 46 when it is in the servo-locked condition, the operation of the comparator is the same. However, the section of the comparator flip-flop 66 responsive to the reference pulses 72 is locked in the conducting state, and the AND-gates 88 and 90 operatively associated with the comparator section locked in the conducting state are gated to couple alternately the reference and tachometer pulses to the OR-gates 94 and 96.

To change the drive signal coupled to the capstan motor 44 in accordance with the distance that the particular storage address 22 must be transported to position it at the selected location 32, the adjustable reference source 50 includes a plurality of pulse generators 106, 108, 110 and 112. Each of the pulse generators of the reference source 50 provides a pulse train at a selected frequency different from the others. The particular frequencies selected depend upon the acceleration characteristic of the transport mechanism 20, the frequency of the tachometer pulses 70 provided at the various speeds the transport mechanism 20 is directed to transport the tape 24, the maximum velocity at which the tape 24 is to be transported, and the various velocities less than the maximum at which the tape 24 is to be transported. In the embodiment of FIG. 1, the pulse generators 106, 108, 110 and 112 are shown as providing pulse trains at the frequencies of 76 kHz., 38 kHz., 10 kHz. and 1 kHz. respectively. These frequencies were selected to control the transport mechanism 20 referred to hereinabove having an acceleration characteristic of 224 inches per second per second, operated to transport the tape 24 at a maximum velocity of 380 i.p.s., and operatively associated with a tachometer 48 providing 200 pulses per inch that the tape 24 is transported. The 76 kHz., 38 kHz., 10 kHz., and 1 kHz. reference pulses 72 respectively cause the phase comparator 46 to generate capstan motor drive signals which direct the transport mechanism 20 to transport the tape 24 at velocities of 380 i.p.s., 190 i.p.s., 50 i.p.s. and 5 i.p.s.

Figure 4:
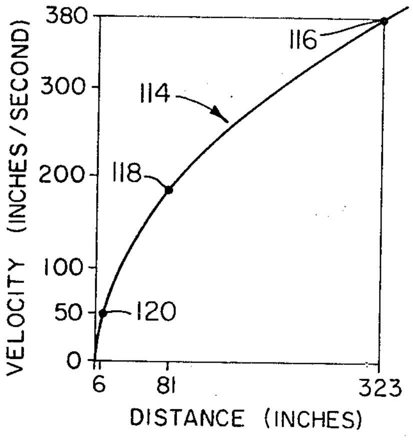
FIG. 4 is a graphical representation of the acceleration characteristic of a particular transport mechanism.

Referring to FIG. 4, the acceleration characteristic of the transport mechanism 20 referred to hereinabove is illustrated graphically as a plot 114 of velocity as a function of distance. The time required to transport the particular storage address 22 to the selected location 32 is minimized if the distance points 116, 118 and 120 at which the motor drive signal is changed lie along the acceleration characteristic and the square of the velocity of the tape 24 divided by two times the distance that the particular storage address 22 must be transported to position it at the selected location 32 always equals the acceleration characteristic of the transport mechanism 20. In the particular embodiment illustrated and described herein, the 76 kHz. reference pulses 72 are coupled to the phase comparator 46 when the distance, *d*, is greater than 323 inches. In response to the 76 kHz. reference pulses 72, the phase comparator 46 generates a motor drive signal which directs the transport mechanism 20 to transport the tape 24 at 380 i.p.s. When the distance, *d*, is in the range of 81 inches to 323 inches, the 38 kHz. reference pulses 72 are coupled to the phase comparator 46 whereby the transport mechanism 20 is directed to transport the tape 24 at 190 i.p.s. The 10 kHz. reference pulses 72 are coupled to the phase comparator 46 whereby the transport mechanism 20 is directed to transport the tape 24 at a speed of 50 i.p.s. when the distance, *d*, is in the range of 6 inches to 81 inches. When the distance, *d*, is less than 6 inches, the 1 kHz. reference pulses 72 are coupled to the phase comparator 46 to direct the transport mechanism 20 to transport the tape 24 at 5 i.p.s.

As explained hereinbefore, inertia prevents an instantaneous change in the velocity of the tape and causes it to change according to the acceleration characteristic of the transport mechanism 20. For example, when the tape 24 is transported by a transport mechanism 20 having an acceleration characteristic exemplified in FIG. 4 and is decelerated under the control of reference pulses 72 having the above-specified frequencies, the following occurs. When the particular storage address 22 reaches the distance, *d*, equal to 323 inches, the frequency of the reference pulses 72 is changed from 76 kHz. to 38 kHz. However, because of inertia, the tape 24 does not reach the 38 kHz. related velocity of 190 i.p.s. until the distance, *d*, is decreased to 81 inches. At this time, the frequency of the reference pulses 72 is changed to 10 kHz. The tape 24 reaches the 10 kHz. related velocity of 50 i.p.s. when the distance, *d*, is decreased to 6 inches. In this manner, the change in the velocity of tape 24 is caused to follow the acceleration characteristic of the transport mechanism 20. Hence, the tape 24 will always be transported at the optimum velocity for rapidly positioning the particular storage address 22 at the selected location 32.

A plurality of gates 122, 124, 126 and 128 are interposed between the pulse generators 106, 108, 110 and 112 respectively and the phase comparator 46 to selectively couple thereto the reference pulses 72 provided by the pulse generators in response to signals received from the preset counter 30. Any of the common preset-type counting means which deliver signals when its count is in a define range may be used as the preset counter 30. However, a binary type reversible setable preset counter facilitates the generation of signals for opening the gates 122, 124, 126 and 128 to couple selectively to the phase comparator 46 the reference pulses 72 provided by the pulse generators 106, 108, 110 and 112. The binary preset counter 30 includes a plurality of binaries arranged in the standard fashion to form a reversible binary counter. The number of binaries employed depends upon the maximum distance the particular storage address 22 will be away from the selected location 32 when readied to be positioned at the locations and the number of counts accumulated by the counter 30 per inch the tape 24 is transported. In the case where television signal images of documents are stored on magnetic tape at frames which are allocated three to the inch, the preset counter 30 should receive at least 10 pulses per inch that the tape 24 is transported. Since the tachometer 48 generates 200 pulses per inch that the tape 24 is transported, a divide-by-twenty divider 130 is coupled to receive the tachometer pulses 70 generated by the pulse generator 64 and provide a single pulse to the input of the preset counter 30 for each twentieth tachometer pulse 70.

The number of binaries required by the preset counter 30 is determined by the equation $$N=[\mathrm{Log}_2(C d_{max}+1)]+f$$

where $C$ is the number of counts accumulated by the preset counter 30 per inch the tape 24 is transported, $d_{max}$ is the maximum distance in inches the particular storage address 22 will be away from the selected location 32 when readied to be positioned at the location, $f$ is the complement of the fractional part of the number equal to $\text{Log}_2\ (C \cdot d_{max}-1)$ and $N$ is the number of binaries required. For example, if $d_{max}$ is 800 inches and $C$ is 10 counts per inch, 13 binaries are required. A binary counter having a binary chain of 13 binaries has a counting capacity of 8191.

To control the coupling of the pulse generator 106, 108, 110 and 112 to the phase comparator 46, the gate 122 is coupled to the preset counter 30 to be opened by a signal received therefrom while its count indicates that the distance, *d*, is greater than 323 inches, or is greater than 3,230. As long as the gate 122 is opened, the 76 kHz. reference pulses 72 are coupled to the phase comparator 46. When the count in the preset counter 30 is in the range of 811 to 3,230 indicating that the distance, *d*, is in the range of 81 inches to 323 inches, the preset counter 30 issues a signal which opens the gate 124. While the gate 124 is opened, the 38 kHz. reference pulses 72 are coupled to the phase comparator 46. The preset counter 30 issues a signal which opens the gate 126 to pass the 10 kHz. reference pulses 72 to the phase comparator 46 while its count is in the range of 61 to 811 indicating that the distance, *d*, is in the range of 6 inches to 81 inches. The gate 128 is opened by a signal received from the preset counter 30 while its count is in the range below 61 indicating that the distance, *d*, is in the range of zero to 6 inches. While the gate 128 is opened, the 1 kHz. reference pulses 76 are coupled to the phase comparator 46.

FIG. 1 shows the apparatus 28 employing a distance-sensing means to determine when the drive signal coupled to direct the transport mechanism should be changed. However, a time-sensing means could be employed as the distance determining device to determine when the drive signal coupled to direct the transport mechanism should be changed. When employing a time-sensing device to control the transport mechanism's drive signal, the time required to transport the particular storage address 22 a certain distance and the time required to accelerate and decelerate the tape 24 to certain speeds are used to determine the control of the transport mechanism's drive signal.

To position a particular storage address 22 at the selected location 32, the distance, *d*, the storage address 22 must be transported is determined and a count representative of the distance is set into the counter 30 via its set terminal 131. The direction that the tape 24 must be transported to position the address 22 at the location 32 is determined and a count direction status signal is input to the counter 30. The counter 30 may be arranged as illustrated in FIG. 2 to have the initial count and count direction status determined and set therein by the operator. Alternatively, these initial conditions can be determined and set automatically into the counter 30 by interrogating the tape 24 which stores information relating to the distances between each of the storage address on the tape 24.

Figure 5A:
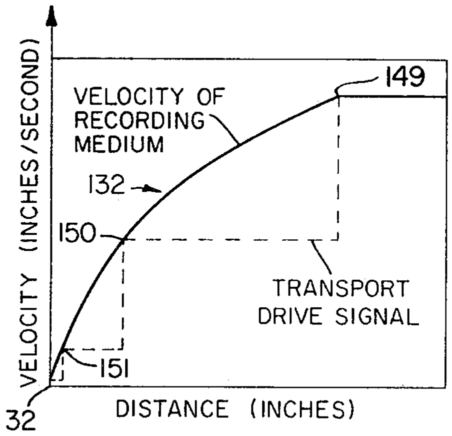
FIG. 5 graphically illustrates the manner in which the speed of a recording medium is controlled in accordance with the present invention under conditions of different relationships between the recording medium transport's acceleration characteristic and the points at which the transport drive signal is incrementally changed with graph (a) illustrating the optimum condition where the ratio of the square of the velocity of the recording medium at each of the points at which a change in the transport drive signal is initiated divided by two times the distance the particular storage address is from the selected location always equals the acceleration characteristic of the transport mechanism, graph (b) illustrating the condition where the acceleration characteristic is greater than the ratio, and graph (c) illustrating the condition where the acceleration characteristic is less than the ratio.

The operation of the apparatus 28 to control the positioning of the tape 24 will be described with reference to FIGS. 1 and 5. Assuming that the apparatus 28 is arranged to change the motor drive signal when the particular storage address 22 is at distances away from the selected location 32 which lie along the acceleration characteristic 132 as shown in FIG. **5*a* and described with reference to FIG. 4, and the tape 24 is to be advanced in the forward direction to position the storage address 22, a count direction status signal, for example, provided by a flip-flop 133, is input by the operator to the preset counter 30. The flip-flop 133 provides a positive output when the preset counter 30 is to be set to count in the reverse direction, or accumulate counts in the subtractive sense, and a zero output when it is to be set to count in the forward direction, or accumulate counts in the additive sense. To set the flip-flop 133 in the proper conduction state, a voltage source 134 is coupled selectively to the input of one of its sections by a momentary circuit closing selector switch 135. If the flip-flop 133 is to be set to ready the preset counter 30 to accumulate counts in the subtractive sense, the selector switch 135 is momentarily closed to connect its contact 136 to the positive pole of the voltage source 134 whereby the flip-flop 133 is switched to the conduction state providing a positive signal to the preset counter 30. The selector switch 135 is momentarily closed to connect the positive pole of the voltage source 134 to its contact 137 when the flip-flop 133 is to be set to provide a zero signal to the preset counter 30 for readying it to accumulate counts in the additive sense. The count direction status signal provided by the flip-flop 133 sets the coupling between the binaries forming the preset counter 30 to accumulate counts in the proper sense, in the specific case described, the subtractive sense. A count representative of the distance that the particular storage address 22 must be moved to position it at the selected location 32, greater than 323 inches as shown in FIG. 5*a*, is set into the preset counter 30 by the operator via the counter terminal 131**.

With the preset counter 30 set in the foregoing condition, gate 122 is opened by the signal from the preset counter 30 issued when its count is greater than 3,230. The opened gate 122 couples the 76 kHz. reference pulses 72 provided by the pulse generator 106 to the phase comparator 46. The transport of the tape 24 is started by operating a second momentary circuit closing selector switch 138. The pole of the selector switch 138 is connected to the positive pole of the voltage source 134 and has two contacts 139 and 140, each connected to one of the sections of a flip-flop 141. The output of one of the sections of the flip-flop 141 is connected to the forward and reverse gates 142 and 143 interposed between the phase comparator 46 and capstan DC motor 44. When the selector switch 138 is operated to connect the voltage source 134 to the contact 139, the flip-flop 141 is set in the conduction state which causes the forward gate 142 to be opened to couple the output of the phase comparator 46 to the forward motor drive amplifier 52 thereby causing the capstan DC motor 44 to be driven to advance the tape 24 in the forward direction. When the contact 140 of the selector switch 138 is connected to the voltage source 134, the flip-flop 141 is set in the opposite conduction state. This causes the reverse gate 143 to be opened to couple the output of the phase comparator 46 to the reverse motor drive amplifier 53 thereby causing the capstan DC motor 44 to be driven to advance the tape 24 in the reverse direction.

Operating the selector switch 138 also momentarily connects the voltage source 134 through isolation diodes 144 and 145 to flip-flops 146 and 147 of a stop control circuit to be described in greater detail hereinbelow. The flip-flops 146 and 147 are set by the voltage source 134 to their conduction states which remove any command signals generated by the stop control circuit to command the transport mechanism to reduce the velocity of the tape 24 to zero and stop its transportation.

With the apparatus 28 arranged to transport the tape 24 in the forward direction, the forward motor drive amplifier 52 delivers a signal to the capstan DC motor 44 which causes the motor to drive the tape 24 in the forward direction. If the tachometer pulses 70 and reference pulses 72 are exactly 180° apart, the forward motor drive amplifier 52 delivers a zero error DC voltage 78 to the capstan DC motor 44 which drives the tape 24 at the desired velocity. If the phase difference between the tachometer pulses 70 and reference pulses 72 is other than 180°, which indicates that the tape 24 is being transported at a velocity different from that represented by the reference pulses 70, the forward motor drive amplifier 52 provides a drive signal which compensates for this difference. For example, if the velocity of the tape 24 is greater than that represented by the reference pulses 70, indicated by a tachometer pulse 70 following a reference pulse 72 by less than 180°, the output of the forward motor drive amplifier 52 is changed by the change in the signal from the phase comparator 46 to decrease the motor drive, hence, the velocity of the tape 24. If the velocity of the tape 24 changes towards being less than that represented by the reference pulses 70, indicated by a tachometer pulse 70 following a reference pulse 72 by more than 180°, the output of the forward motor drive amplifier 52 is changed by the change in the signal from , comparator 46 to increase the motor drive, hence, the velocity of the tape 24. The biases of the forward and reverse amplifiers 52 and 53 are set relative to the output signal provided by the phase comparator 46 so that they provide a zero motor drive signal when the phase comparator 46 is in the servo-unlocked condition and the velocity of the tape 24 is greater than that represented by the reference pulses 72 coupled to the phase comparator 46, and a maximum motor drive signal when in servo-unlocked condition and the velocity of the tape 24 is less than that represented by the reference pulses 72 coupled to the phase comparator 46.

When the tape 24 is transported in the reverse direction and the reverse gate 143 is opened, the operation of the phase comparator 46 and the reverse motor drive amplifier 53 is similar. However, to operate the capstan DC motor 44 to transport the tape 24 in the reverse direction, the sense of the motor drive signal must be opposite that when the tape 24 is transported in the forward direction. Hence, an inverter 148 is inserted between the phase comparator 46 and the capstan DC motor 44 to provide reverse motor drive signal.

The phase comparator 46 responds to the 76 kHz. reference pulses 72 by issuing a signal which is coupled by the forward gate 142 to drive the capstan DC motor 44 to cause the tape 24 to be advanced at 380 i.p.s. in the forward direction. As the tape 24 is transported in the forward direction, the capstan DC motor rotates the timing wheel 54 of the tachometer 48 in a corresponding direction and at a corresponding speed. The tachometer pulses 70 generated by the tachometer 48 and issued by the pulse generator 64 are divided by the pulse divider 130 and coupled to the preset counter 30 to be counted in the subtractive sense at a rate of 10 pulses per inch of tape that is transported. Each pulse received by the preset counter 30 reduces the count set into the counter by one count.

When the count of the preset counter 30 is reduced to 3,230, corresponding to point 149 on FIG. 5*a*, the preset counter 30 terminates the signal opening gate 122 and issues a signal opening gate 124. This removes the 76 kHz. references pulses 72 from the phase comparator 46 and replaces them with the 38 kHz. reference pulses 72 provided by the pulse generator 108. The 38 kHz. reference pulses 72 corresponds to a tape velocity of 190 i.p.s. However, since the timing wheel 54 of the tachometer 48 is rotating at a speed corresponding to a tape velocity of 380 i.p.s., the phase comparator 46 issues a corrective error signal indicative of excessive tape velocity. The error signal causes the output of the forward motor drive amplifier 52 to be decreased to reduce the motor drive signal to slow the capstan DC motor 44 to a speed that results in the tape velocity being reduced to 190 i.p.s.

Because of the inertia of the transport mechanism 20, the velocity of the tape 24 is not reduced until the particular storage address 22 reaches a distance of 81 inches from the selected location (see point 150 on FIG. 5*a*). When the storage address 22 reaches a distance of 81 inches from the selected location 32, the count in the preset counter 30 is reduced to 810. At this point, the preset counter terminates the signal opening gate 124 and issues a signal opening gate 126. This removes the 38 kHz. reference pulses 72 provided by the pulse generator 108 from the phase comparator 46 and replaces them with the 10 kHz. reference pulses 72 provided by the pulse generator 110. Since the tachometer 48 is providing tachometer pulses 70 corresponding to a tape velocity of 190 i.p.s. and the 10 kHz. reference pulses 72 correspond to a tape velocity of 50 i.p.s., the phase comparator 46 issues a corrective error signal indicative of the excessive tape velocity. This error signal causes the output of the forward motor drive amplifier 52 to be decreased to reduce the motor drive signal to slow the capstan DC motor 44 to a speed that results in the tape velocity being reduced to 50 i.p.s.

Figure 5B:
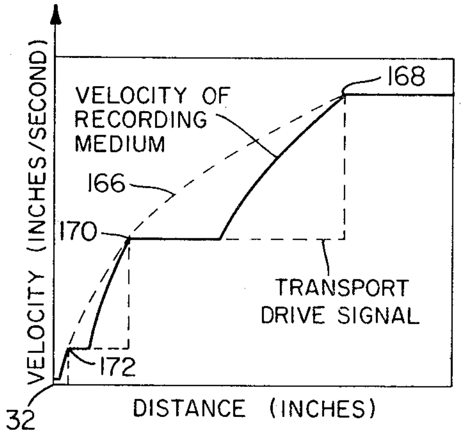
Figure 5C:
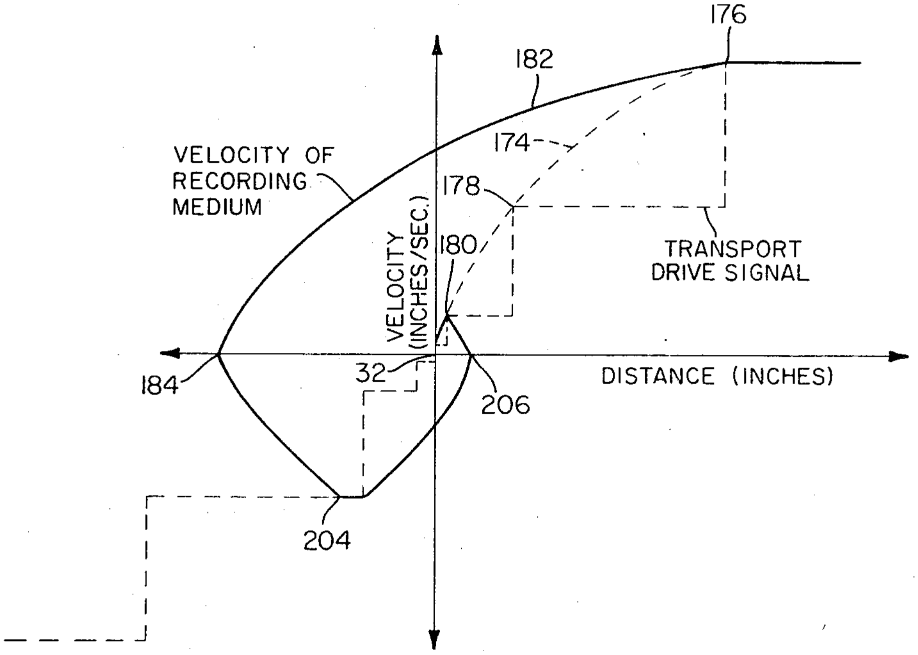

Again, because of the inertia of the transport mechanism 20, the velocity of the tape 24 is not reduced to 50 i.p.s. until the particular storage address 22 reaches a distance which is 6 inches from the selected location (see point 151 on FIG. 5). At this time, the count in the preset counter 30 is reduced to 60. When the count in the preset counter 30 reaches 60, the signal opening gate 126 if terminated and a signal opening gate 128 is issued. Closing gate 126 and opening gate 128 results in removing the 10 kHz. reference pulses 72 provided by the pulse generator 110 from the phase comparator 46 and replacing them with the 1 kHz. reference pulses 72 provided by the pulse generator 112. Since the tachometer pulses 72 provided by the tachometer 48 correspond to a tape velocity of 50 i.p.s. and 1 kHz. reference pulses 72 correspond to a tape velocity of 5 i.p.s., the phase comparator 46 issues a corrective error signal indicative of the excessive tape velocity. The error signal causes the motor drive signal to be reduced so that the capstan DC motor 44 is slowed to a speed that results in the tape velocity being reduced to 5 i.p.s. The tape velocity is reduced to 5 i.p.s. when the particular storage address 22 reaches a distance of about one-sixteenth of an inch from the selected location 32. At this time, the phase comparator 46 issues a zero error voltage signal. The capstan servo loop formed by the capstan motor 44, tachometer 48, adjustable reference source 50 and the phase comparator 46 function to maintain the capstan motor 44 at a speed which causes the tape to be transported at a velocity to 5 i.p.s. until the frequency of the reference pulses 72 is changed or a stop command signal is issued by one of the flip-flops 146 and 147.

In the example shown in FIG. 5*a*, when the count in the preset counter 30 reaches zero, which occurs when the particular storage address 22 reaches the selected location 32, a stop command signal is issued. The stop command signal closes the stop gate 152 connected between the input of the capstan DC motor 44 and the common junction 154 of the outputs of the forward and reverse direction circuit paths including the motor drive amplifiers 52 an 53. This disconnects the motor drive signal from the capstan DC motor 44, thereby, commanding the capstan DC motor 44 to reduce the velocity at which the tape 24 is transported to zero.

The condition of the stop gate 152 is controlled by the conduction state of two flip-flops 146 and 147. Flip-flop 146 operates to provide a temporary stop command which, as will be explained further hereinbelow, is required if the particular storage address 22 overshoots the selected location 32. The flip-flop 147 operates to provide a permanent stop command when the velocity of tape 24 is zero and the particular storage address 22 is at the selected location 32.

The flip-flops 146 and 147 normally are set in a state to maintain the stop gate 152 open, to couple the outputs of the motor drive amplifiers 52 and 53 to the capstan DC motor 44. The output of a section of each of the flip-flops 146 and 147 is coupled to an OR-gate 156 which provides a stop command signal to the stop gate 152 whenever the state of one of the flip-flops 146 and 147 is other then normal. The stop sequence is initiated by a signal generated by the preset counter 30 when its count reaches zero. The zero count signal provided by the preset counter 30 is coupled directly to the flip-flop 146 to change its conduction state from the normal state to the stop state. This causes the OR-gate 156 to issue a stop command signal to the stop gate 152. The conduction state of the flip-flop 146 is returned to its normal state, hence, its stop signal initiating command is removed from the OR-gate 156, by a signal provided by a preset binary counter 158. The preset counter 158 is coupled to the 1 kHz. pulse generator 112 to count the pulses issued thereby. The preset counter also is coupled to the output of the tachometer 46 to have its count reset to zero each time a tachometer pulse 70 is generated. In the embodiment described in detail, the preset counter 158 is preset to issue a signal to reset the flip-flop 146 to its normal state when its count reaches four. This requires the interval between the tachometer pulses 70 to be greater than 3 milliseconds. This corresponds to a tape velocity of about 2 inches per second. If the interval is less than 3 milliseconds, the preset counter 158 will be reset by the tachometer 48 before its count reaches four.

The operation of flip-flop 146 can best be understood by reference to FIG. 5 which illustrates the case when the particular storage address 22 overshoots the selected location 32. When the storage address 22 overshoots the location 32, it becomes necessary to reverse the direction which the tape 24 is transported. The counter 158 determines when the velocity of the tape 24 is reduced to the point when the direction that the tape 24 is being transported is to be reversed. In the above example, a tape speed of about 2 inches per second was selected. When the tape reaches this speed, the preset counter 158 will reach a count of four before being reset by the tachometer 48. The preset counter 158 issues a signal which resets the flip-flop 146 to its normal state. This causes the stop command signal to be removed from the stop gate 152 which results in the capstan DC motor being coupled to the motor drive amplifiers 52 and 53 whereby the motor is accelerated in the opposite direction to transport the tape 24 in a direction opposite to the previous direction.

Flip-flop 147 issues a permanent stop command signal when the particular storage address 22 reaches the selected location 32 and the tape velocity is low enough so that the tape 24 essentially can be instantaneously stopped. At a tape velocity of 5 i.p.s., it was found that the inertia of the transport mechanism 20 is low enough to allow the tape 24 to be stopped fast enough to place the particular storage address 22 precisely at the selected location 32. To measure the velocity at which the tape 24 is being transported as its particular storage address 22 passes the selected location 32, a gate 160 is opened by the zero count signal provided by the preset counter 30 when its count is zero. The gate 160 is coupled to the 1 kHz. pulse generator 112 and passes the pulses to a preset counter 162 when it is opened by the zero count signal. The counter 162 is preset to issue a signal to the flip-flop 147 when it has counted 20 pulses received from the pulse generator 112 while the count in the preset counter 30 is zero. This signal causes the flip-flop 147 to change its conduction state from the normal state to the stop state which results in the OR-gate 156 issuing a stop command signal which closes the stop gate 152.

If the velocity of the tape 24 is greater than 5 i.p.s. when the particular storage address 22 reaches the selected location 32, the zero count signal provided by the preset counter 30 will be terminated before the counter 162 receives 20 pulses from the 1 kHz. pulse generator 112. When the zero count signal is terminated, the gate 160 is closed, thereby, preventing the 1 kHz. pulses from being coupled to the counter 162. To ready the counter 162 to measure the velocity of the tape 24 the next time that its particular storage address 22 reaches the selected location 32, the preset counter 30 is coupled to provide a signal when its count is one to reset the counter 162.

By selecting the distance points at which the motor drive signal is decreased so that the square of the velocity of the tape 24 divided by two times the distance that the particular storage address 22 must be transported to position it at the selected location 32 always equals the acceleration characteristic of the transport mechanism 20, the tape velocity will follow the plot 132 of FIG. *5a* during the deceleration of the tape 24. However, the preset invention has the additional important feature that the particular storage address 22 will always be positioned at the selected location 32 even if the motor drive signal is changed when the square of the velocity of the tape 24 divided by two times the distance that the particular storage address 22 must be transported to position it at the selected location is less than the acceleration characteristic (see FIG. 5) or if the motor drive signal is changed when the square of the tape velocity divided by two times the distance is greater than the acceleration characteristic (see FIG. *5c*).

Considering first the case illustrated in FIG. *5b* where the locus 166 defined by the motor drive signal change points 168, 170 and 172 defines a deceleration which is less than that of the transport mechanism 20, it is seen that the tape 2 is decelerated in steps separated by intervals of constant tape velocity 24. The tape 24 will be decelerated in this manner if the deceleration is started prematurely, i.e., in the case of a transport mechanism 20 having an acceleration characteristic of 224 inches per second per second, when the particular storage address 22 is more than 323 inches from the selected location 32. Starting the deceleration prematurely generally is a result of improperly selecting the distance points at which the motor drive signal is changed, or a change in the acceleration characteristic caused by a malfunction in the transport mechanism 20 or normal wear and tear of the transport mechanism 20. In any event, when the deceleration is started prematurely, for example, at a distant point 168 greater than 323 inches, the velocity of the tape 24 will decrease to that corresponding to the reduced motor drive signal in a shorter time than the particular storage address 22 requires to reach the distance point 170 at which the next motor drive signal change is to occur. When the tape velocity initially reaches the velocity corresponding to the reduced motor drive signal, the count in the preset counter 30 is greater than 811 which is required to operate the gates to select the lower frequency reference pulses 72. However, the frequency of the reference pulses 72 and of the tachometer pulses 70 are equal. Hence, the phase comparator 46 locks the capstan DC motor 44 to a speed which maintains the velocity of the tape 24 constant at that productive of a tachometer pulse frequency equal to the reference pulse frequency. The velocity remains constant until the counts in the preset counter 30 is reduced to 811 which corresponds to the next selected distance point 170 at which the motor drive signal is to be reduced. At this time, the preset counter 30 operates the gates 122 and 124 in the same manner as described hereinbefore with reference to FIG. *5a* to couple the proper pulse generator 108 of the adjustable reference source 50 to the phase comparator 46. The foregoing is repeated until the tape is transported 24 at a velocity of 5 i.p.s. At this point, the operation is the same as described hereinbefore with reference to FIG. *5a*, i.e., the tape 24 is transported at a velocity of 5 i.p.s. until the count in the preset counter 30 is reduced to zero at which time the flip-flop 147 operates to generate a stop command signal. This stop command signal permanently terminates the transport of the tape 24.

Considering the case illustrated in FIG. *5c* where the locus 174 of the motor drive signal change points 176, 178 and 180 defines a deceleration which is greater than that of the transport mechanism 20, it is seen that the tape 24 decelerates according to the acceleration characteristic of the transport mechanism 20 and causes the particular storage address 22 to overshoot the selected location 32. The direction of the transport of the tape 24 is then reversed each time the storage address 22 overshoots the selected location 32 until the velocity of the tape 24 is no greater than 5 i.p.s. when the address 22 reaches the location 32. The tape 24 will be transported in this manner when positioning the particular storage address 22 at the selected location 32 if the initial deceleration is started late, i.e., in the case of a transport mechanism 20 having an acceleration characteristic of 224 inches per second per second, when the particular storage address 22 is less than 323 inches from the selected location 32. Starting the deceleration late generally is a result of improperly selecting the distance point 176 at which the motor drive signal is initially decreased, or a change in the acceleration characteristic caused by a malfunction in or normal wear and tear of the transport mechanism 20. When the deceleration of the tape 24 is started late, for example, as a result of setting the preset counter 30 to issue signals to control the gates 122, 124 and 126 at counts less than that corresponding to distance points 176, 178 and 180 less than 323 inches, 81 inches and 50 inches, the velocity of the tape 24 will not decrease to that represented by the reference pulses 72 while the particular storage address 22 initially is transported towards the selected location 32. Consequently, the tape 24 will decelerate according to the acceleration characteristic 182 of the transport mechanism 20 and the particular storage address 22 will overshoot the selected location 32 to be positioned at a distance point 184 beyond the selected location 32.

During the initial deceleration of the tape 24, the count in the preset counter 30 is reduced to zero when the particular storage address 22 passes the selected location 32. Since the velocity of the tape 24 is greater than 5 i.p.s. when the storage address 22 initially passes the selected location 32, the counter 162 does not accumulate a count of 20 while the count of the preset counter 30 is zero. Hence, the conduction state of the flip-flop 147 is not set to the stop state to initiate the issuance of a permanent stop command signal. However, the conduction state of the flip-flop 146 is set to the stop state to issue a temporary stop command signal.

Although a temporary stop command signal is issued by the flip-flop 146 to disconnect the motor drive signal from the capstan DC motor 44, the inertia of the transport mechanism 20 causes the tape 24 to be transported to position the storage address 22 at the distance point 184 beyond the selected location 32. As the tape 24 is transported after the storage address 22 passes the selected location 32, the reversible preset counter 30 continues to receive divided tachometer pulses from the pulse divider 130. Since the count in the preset counter 30 is reduced to zero when the storage address 22 passes through the selected location 32, the divided tachometer pulses received as the tape 24 is continued to be transported in the same direction to position the storage address 22 beyond the selected location 32 are accumulated by the preset counter 30 in the additive sense. In this manner, the preset counter 30 keeps track of the distance that the storage address 22 is transported beyond the selected location 32.

To reverse the counting sense of the preset counter 30 when the storage address 22 overshoots the selected location 32, a gate 186 is coupled to the input of the section of the flip-flop 133 which conducts when the flip-flop provides a positive output signal to cause the preset counter 30 to accumulate counts in the subtractive sense. A second gate 187 is coupled to the input of the other section of the flip-flop 133 which conducts when it provides a zero output signal to cause the preset counter 30 to accumulate counts in the additive sense. When the count in the preset counter 30 reaches zero, a zero count signal issued by the preset counter is coupled by OR-gates 188 and 189 to the inputs of the gates 186 and 187 respectively. The output of the flip-flop 133 also is coupled to the gates 186 and 187 to open one of the gates to pass the zero count signal. The gates 186 and 187 are arranged so that if the output of the flip-flop 133 is positive, hence, the preset counter 30 accumulating counts in the subtractive sense, the gate 187 is opened. This allows the zero count signal to pass to the section of the flip-flop 133 in the off conducting state. The zero count signal causes the flip-flop 133 to change its conducting state and, thereby, to provide a zero output signal which sets the preset counter 30 to accumulate counts in the additive sense. If the output of the flip-flop 133 is zero when the count in the preset counter 30 reaches zero, hence, the preset counter 30 accumulating counts in the additive sense, the gate 186 is opened. The opened gate 186 passes the zero count signal to the section of the flip-flop 133 in the off conducting state which causes it to conduct. This causes the output of the flip-flop 133 to be switched from zero to positive, thereby, setting the preset counter 30 to accumulate counts in the subtractive sense.

When the particular storage address 22 reaches the distance point 184, the velocity of the tape 24 is slow enough so that the counter 158 is able to count four pulses issued by the 1 kHz. pulse generator 112 between successive tachometer pulses 70. Hence, the flip-flop 146 is reset to its normal conduction state and the temporary stop command signal removed from the stop gate 152. This opens the stop gate 152 and allows the phase comparator 46 to provide a motor drive signal to the capstan DC motor 44 in accordance with the count in the preset counter 30. The output of the counter 158 also is coupled to the OR-gates 188 and 189 which in turn provide an input to the gates 186 and 187 to control the conduction state of the flip-flop 133, hence, the count direction status of the preset counter 30, in the same manner as the OR gates do in response to the zero count signal received from the preset counter 30. In the example illustrated in FIG. 5c, prior to the storage address 22 reaching the distance point 184, the preset counter is accumulating counts in the additive sense. Hence, the output of the flip-flop 133 is zero and the gate 186 opened to pass a signal from the OR-gate 188 to the flip-flop 133 and the gate 187 closed to prevent a signal from OR-gate 189 reaching the flip-flop 133. When the counter 158 issues a signal as the storage address 22 reaches the distance point 184, the gate 186 passes the signal received from the OR-gate 188. This signal causes the conducting state of the flip-flop 133 to change whereby a positive signal is provided to the preset counter 30. This readies the preset counter 30 to start accumulating counts in the subtractive sense.

Since the tape 24 must be transported in the opposite direction to transport the particular storage address 22 from the distance point 184 to the selected location 32, the forward gate 142 must be closed and the reverse gate 143 opened to provide the proper motor drive signal to the capstan DC motor 44. To change the conducting state of flip-flop 141, two gates 190 and 191 are provided which are responsive to a signal issued by the preset counter 30 when its count reaches zero. The gates 190 and 191 are selectively gated open by a motion direction status sensing circuit 192 to pass the zero count signal issued by the preset counter 30. The motion direction sensing circuit 192 includes a synchronous J-K flip-flop 193 which receives negative trigger pulses from the pulse generator 64 and a second pulse generator 194. The J-K flip-flop responds to the negative trigger pulses to provide an output signal indicative the direction that the tachometer wheel 54, hence, tape 24, is being transported. The second pulse generator 194 is coupled to a photocell 196 which, like the photocell 58, provides an output each time a timing mark 60 of the tachometer's timing wheel 54 passes through a light beam 198 projected by a second source 200. The photocells 58 and 196 are physically positioned so that the outputs provided thereby are separated electrically in phase by 90°. When the tape 24 is being transported in the forward direction, the output of the photocell 196 follows that provided by the photocell 58 by 90°. When the tape 24 is being transported in the reverse direction, the output of the photocell 196 leads that provided by the photocell 58 by 90°. The pulses provided by the pulse generator 64 are coupled to both sections of the flip-flop 193 to set them in their conducting states. An inverter 202 is provided in series with the input to one of the sections of the flip-flop 193 so that the presence of the pulse provided by the pulse generator 64 causes one of the sections of the flip-flop to conduct while its absence causes the other section to conduct. The pulses provided by the pulse generator 194 are coupled to clock the pulses coupled to the input of the two sections of the flip-flop 193 from the pulse generator 194 so that if a pulse from the pulse generator 64 is present during the trailing edge of the negative clock pulse the associated section of the flip-flop 193 conducts, whereas, the other section of the flip-flop 193 conducts if a pulse is absent during the trailing edge of the clock pulse. In this manner, the voltage level at the output of one of the sections of the flip-flop 193 will be maintained, for example, positive as long as the tape 24 is being transported in the forward direction, hence, the clock pulses provided by the pulse generator 194 trailing the pulses provided by the pulse generator 64, and zero as long as the tape 24 is being transported in the reverse direction, hence, the clock pulses leading the pulses provided by the pulse generator 194.

Gate 190 is coupled to the output of the flip-flop 193 and is gated open to pass the zero count signal provided by the counter 30 when the output of the flip-flop is zero. Gate 191 also is coupled to the output of the flip-flop 193 and is gated open to pass the zero count signal when the output of the flip-flop is positive. The gate 190 is coupled to the input of the section of the flip-flop 141 which is conducting when the tape 24 is transported in the forward direction. The gate 191 is coupled to the input of the section of the flip-flop 141 which is conducting when the tape 24 is transported in the reverse direction. Hence, when the preset counter 30 issues the zero count signal while the tape is being transported in the forward direction, gate 191 is opened by the positive output of the flip-flop 193 and, thereby, is readied to cause the flip-flop 141 to be set to its reverse state by the zero count signal. This readies the reverse gate 143 to couple the output of the phase comparator 46 to the capstan DC motor 44 when the stop gate 152 is opened to allow the tape 24 to be transported in the reverse direction to move the storage address 24 from the distant point 184 towards the selected location 32. If the tape 24 is being transported in the reverse direction, gate 190 is opened by the zero output of the flip-flop 193. Hence, when the preset counter 30 issues a zero count signal while the tape 24 is being transported in the reverse direction, the gate 190 operates to set the flip-flop 141 in its forward conducting state.

When the stop gate 152 is opened by setting the flip-flop 146 to its normal state, the motor drive signal causes the capstan DC motor 44 to be accelerated to transport the tape 24 in the reverse direction. Because of the inertia of the transport mechanism 20, the tape 24 will not instantaneously be transported in the reverse direction at the velocity related to the count stored in the preset counter 30 corresponding to the distant point 184. Instead, the tape 24 accelerates according to the transport mechanism's acceleration characteristic until its velocity reaches that corresponding to the velocity represented by the reference pulses 70 coupled to the phase comparator 46. For example, in the case illustrated in FIG. 5*c*, the particular storage address 22 is shown as overshooting the selected location 32 by a distance less than 323 inches but greater than 81 inches. Hence, the preset counter 30 issues a signal opening the gate 124 which couples the 38 kHz. reference pulses 72 to the phase comparator 46. Since the 38 kHz. reference pulses 72 represent a velocity that is greater than the velocity at which the tape 24 is being transported as represented by the tachometer pulses 70, the phase comparator 46 is locked in the servo-unlocked condition. As the tape 24 is accelerated in the reverse direction to transport the storage address 22 from the distant point 184 towards the selected location 32, the output of reverse motor drive amplifier 53 continues to increase the velocity of tape 24 until it reaches that velocity corresponding to point 204 in FIG. 5*c*. At this point, the tape 24 is being transported at a velocity corresponding to that represented by the 38 kHz. reference pulses 72 coupled to the phase comparator 46. Hence, the tachometer pulses 70 and reference pulses 72 are separated exactly 180° in phase and the velocity of the tape 24 is locked to that represented by the reference pulses 72.

As the particular storage address 22 continues to be transported towards the selected location 32, the tape 24 again is decelerated. However, since the deceleration of the tape 24 is too slow, the storage address 22 again overshoots the selected location 32 to the distance point 206. The apparatus 28 functions in the same manner while the tape 24 is decelerated as it is being transported in the reverse direction as it does while the tape 24 is decelerated as it is being transported in the forward direction. Therefore, even though the particular storage address 22 may overshoot the selected location 32 several times as the tape 24 is transported alternately in the forward and reverse directions, each time the tape 24 is transported in a different direction the distance the storage address 22 overshoots the selected location 32 is decreased. Hence, eventually the velocity of the tape 24 will be reduced to 5 i.p.s. when the storage address 22 is at the selected location 32, and thus the storage address 22 positioned at the selected location 32.

Figure 6:
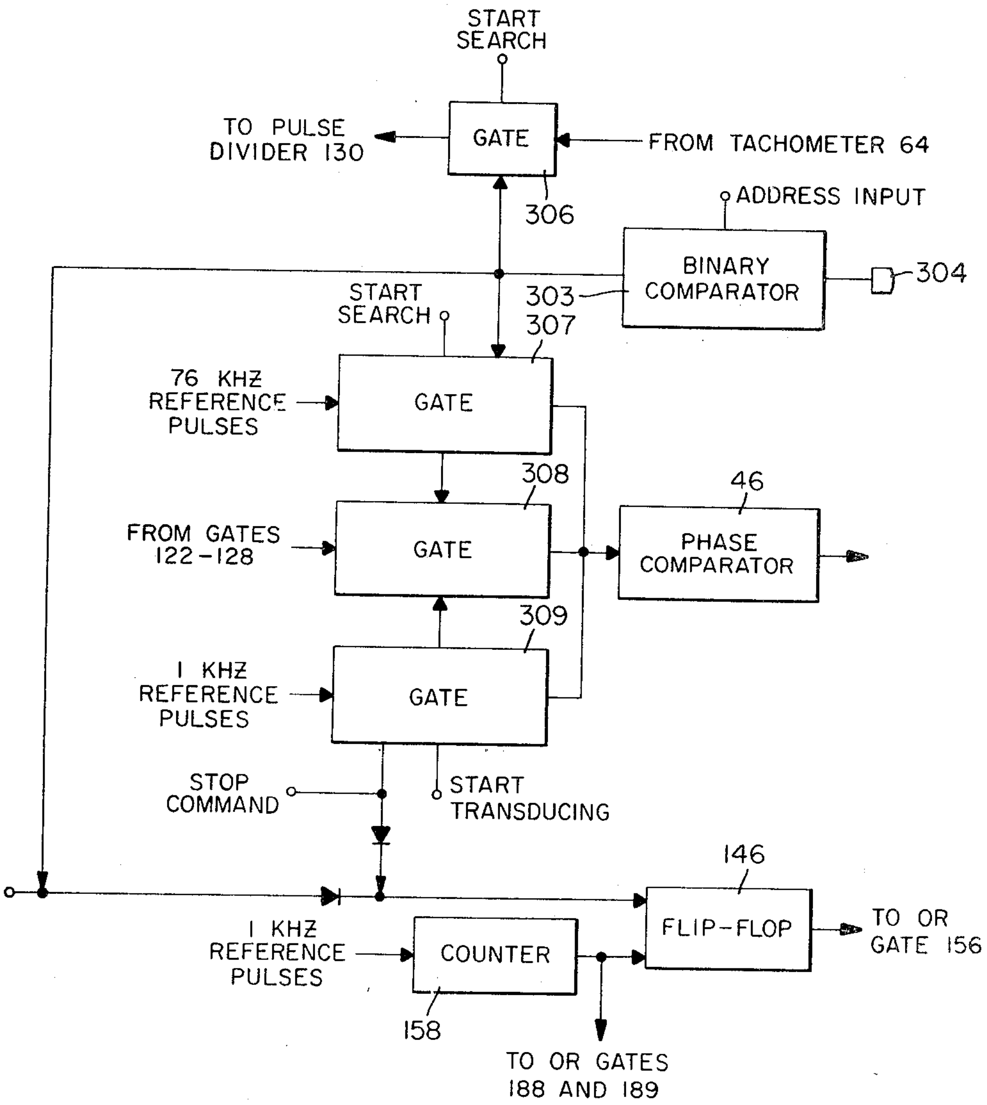
FIG. 6 is a schematic block diagram of a portion of FIG. 1 in modified form.

With reference to FIG. 6, the apparatus 28 is shown as modified to search the tape 24 for the particular storage address 22 and then position the storage address 22 at the selected location 32 relative to the magnetic head 26 for subsequent transduction of information from and on the tape 24. To locate the particular storage address 22, a binary number corresponding to the binary number represented by address marks 301 recorded at the particular storage address 22 in the adjacent portion of an address track 302 is input to a binary number comparator 303. The binary number comparator 303 is coupled to a read address head 304 to receive a train of pulses therefrom in response to the detection of address marks 301 which represents the binary number formed by the recorded address marks 301. When operating in the search-for-address mode, a gate 306 interposed between the pulse generator 64 of the tachometer 48 is set to inhibit coupling of tachometer pulses 70 to the pulse divider 130 and counter 30. Also, a search gate 307 interposed the phase comparator 46 and the 76 kHz. reference pulse generator 106 is set to allow the 76 kHz. reference pulses 72 to be coupled to the phase comparator 46. While the search gate 307 is set to couple the reference pulses 72 to the phase comparator 46, a cue gate 308 and transduction gate 309 are inhibited from coupling the phase comparator 46 to receive reference pulses 72 therethrough As described hereinbefore, the 76 kHz. reference cause the phase comparator 46 to direct the capstan DC motor 44 to transport the tape 24 at 280 i.p.s.

Referring both to FIGS. 1 and 6, assuming that the tape 24 is transported in the forward direction during the search-for-address mode, the flip-flop 141 will be set by the operation of the selector switch 138 to cause the forward gate 142 to be opened. The flip-flop 133 will be set by the operation of the selector switch 135 to cause the counter 30 to be readied to count in the forward or additive sense. When an address match occurs, the binary number comparator 303 issues a signal which removes the inhibit state of the gate 306, thereby, allowing tachometer pulses 70 to be counted by the counter 30. The signal issued by the binary number comparator 303 also is coupled to the flip-flop 146 to cause it to change its conduction state to the stop state whereby a temporary stop command is issued to the stop gate 152. This removes the drive signal from the capstan DC motor 44 and the tape 24 decelerates to a zero velocity according to the acceleration characteristic of the transport mechanism 20. The signal issued by the binary number comparator 303 also is coupled to set the search gate 307 in the inhibit state. The search gate 307 is coupled to the cue gate 308 to release the inhibit state of the cue gate 308 when the search gate is inhibited. This allows the phase comparator 46 to be coupled to all of the reference pulse generators of the adjustable reference source 50 for controlling the transportation of the tape 24 in accordance with the present invention to position the particular storage address 22 at the selected location 32.

While the tape 24 decelerates, the counter 30 accumulates counts in the additive sense, thereby, keeping track of the distance that the particular storage address is transported beyond the selected location 32.

When the velocity of the tape 24 is reduced to about 2 i.p.s., the temporary stop command is removed from the stop gate 152 by the operation of the counter 158. This allows the motor drive signal to be coupled to the capstan DC motor 44 to accelerate it in the manner described hereinbefore with respect to the case when an overshoot occurs (see FIG. 5*c*) to transport the tape 24 in the reverse direction for positioning the particular storage address 22 at the selected location 32. Since the count in counter 30 is zero when the binary number comparator 303 causes the temporary stop command to be issued, the conduction state of the flip-flop 133 is changed by the operation of the counter 158 in removing the temporary stop command in the same manner as described hereinbefore. Thus, the count direction status of the counter 30 is changed to the proper subtractive sense when the particular storage address 22 is transported in the reverse direction to position it at the selected location 32 after the search-for-address mode of operation is completed. Similarly, the conduction state of the flip-flop 141 is changed to release the inhibit on the reverse gate 143 by the operation of the counter 158 in the manner described hereinbefore.

After the search-for-address mode has been completed, the apparatus 28 functions in the manner described hereinbefore to position the particular storage address 22 at the selected location 32 in preparation for access by the magnetic head 26. When it is desired to transduce information from or on the tape 24, the transduction gate 309 is activated by, for example, the operator to couple the 1 kHz. reference pulse generator 112 to the phase comparator 46. The release of the inhibit of the transduction gate 309 inhibits the cue gate 308. With the 1 kHz. reference pulse generator 112 coupled to the phase comparator 46, the capstan DC motor 44 transports the tape 24 at a velocity of 5 i.p.s. At the completion of the transduction operation, the record and reproduce electronics issue a stop command which is coupled to the flip-flop 146 to cause a temporary stop command signal to be issued. This stop command also is coupled to place the transduction gate 309 in its inhibit state. During the transduction operation, the counter 30 receives tachometer pulses 70, thereby keeping track of the distance that the particular storage address 22 is moved from the selected location 32 during the transduction operation. Generally, this distance is about 30 frames. When the velocity of the tape 24 is reduced to zero following the transduction operation, the operation of the apparatus 28 is the same as described hereinbefore with respect to the case when an overshoot occurs to reposition the particular storage address at the selected location 32.

From the foregoing description, it is seen that in accordance with present invention the transportation of a recording medium to position its storage addresses at a particular location for access by information handling means can be controlled by apparatus having well-known logic circuit components particularly arranged to determine the proper speed commands to issue to the recording medium's transport mechanism. The apparatus controls the recording medium's transport mechanism by changing the speed command issued to the transport mechanism when the particular storage address to be positioned at the selected location is at certain predetermined distances from the selected location. Preferably, the distances from the selected location at which the speed command changes are effected, are selected with respect to the acceleration characteristic of the recording medium's transport mechanism so that the velocity as a function of distance locus of the recording medium's velocity at the distances from the selected location at which speed changes occur defines an acceleration constant which is equal to or less than the acceleration characteristic of the transport mechanism. However, the detailed description of the preferred embodiments of the present invention has been given to enable one skilled in the art to understand, make and use the present invention, and no unnecessary limitations should be inferred therefrom since modifications will be obvious to those skilled in the art.

What is claimed is:

1. Apparatus for transporting a recording medium for storing information to position a particular storage address thereof at a selected location relative to means for transferring information between the recording medium and an information processing means including a transport mechanism able to transport the recording medium at different velocities comprising:

a counter preset to issue different signals while its count is within different predetermined ranges of its counting sequence, said counter having an initial count set therein representative of the initial distance that the particular storage address must be transported to position it at the selected location, means responsive to the transport of the recording medium to provide a selected number of pulses per unit length of transported recording medium, means for coupling said pulses related to the unit length of transported recording medium to the counter to decrease the count therein as the particular storage address is transported towards the selected location, means responsive to the different signals issued by the counter as the particular storage address is transported to position it at the selected location to command the transport mechanism to transport the recording medium at a maximum selected velocity and at a plurality of different lower selected velocities, said commanding means coupled to the counter to receive its signals and responsively command the transport mechanism to transport the recording at lower ones of the selected velocities while the count in said counter is within smaller ones of the different predetermined ranges, means responsive to the transport of the recording medium to provide a signal representative of the velocity at which the recording medium is transported, means responsive to the velocity representative signal to maintain the transport of the recording medium at a velocity at least equal to the commanded selected velocity, and means responsive to the signal output by the counter when the particular storage address is positioned at the selected location to stop the transportation of the recording medium.

2. The apparatus according to claim 1 wherein said means for maintaining the velocity at which the recording medium is transported includes means for comparing the velocity representative signal to a reference signal representative of a desired selected velocity to provide correction signals representative of differences between the velocity of the transported recording medium and the desired selected velocity, the transport mechanism responsive to the correction signals to maintain the velocity of the transported recording medium at a velocity corresponding to that represented by the reference signal; and said command means includes a reference source providing reference signals representative of the different selected velocities, and means responsive to the different signals issued by the counter to couple the different ones of the reference signals to the comparator means.

3. The apparatus according to claim 2 wherein said reference source provides reference signals at different frequencies each of which represents one of the selected velocities, said velocity signal providing means provides a signal whose frequency is representative of the velocity at which the recording medium is being transported, and said comparator means compares the frequencies of the reference signal and velocity representative signal to provide the correction signal when the compared frequencies are different.

4. The apparatus according to claim 3 wherein said reference source provides trains of reference pulses at different pulse repetition rates each of which represents one of the selected velocities, said velocity signal providing means provides a train of pulses whose pulse repetition rate represents the velocity at which the record medium is being transported, and said comparator means is a phase comparator which compares the time relationship of the reference pulses and the velocity representative pulses to provide the correction signal when the time relationship represents a recording medium velocity different than the selected velocity.

5. The apparatus according to claim 2 wherein said reference source comprises a plurality of reference signal generators each of which provides one of the reference signals; and said means responsive to the different signals issued by the counter to couple the different ones of the signals to the comparator means comprising a plurality of electronic gates, each of said electronic gates having one input coupled to an associated reference signal generator to receive the reference signal provided thereby, said electronic gates having second inputs coupled to the counter to receive the different signals issued thereby, and different ones of the electronic gates responsive to said different signals issued by the counter to couple the associated reference signal generator to said comparator means.

6. The apparatus according to claim 1 wherein said means for stopping the transportation of the recording medium comprises means for generating a signal to command the transport mechanism to stop the transportation of the recording medium, means responsive to the signal output by the counter when the particular storage address is positioned at the selected location to couple the stop command signal to the transport mechanism, and means responsive to the counter to remove the stop command signaL from the transport mechanism when the signal output by the counter is indicative of the particular storage address being located other than at the selected location when the transportation of the recording medium is stopped.

7. The apparatus according to claim 1 wherein the transport mechanism has a certain acceleration characteristic, and the distances represented by the counts at which the counter issues the different signals and the corresponding different selected velocities at which the recording medium is commanded to be transported are selected with respect to the transport mechanism's acceleration characteristic such that the different selected velocities define an acceleration constant which is not greater than the transport mechanism's acceleration characteristic.

8. The apparatus according to claim 1 wherein said recording medium has address signals recorded thereon to identify its storage addresses, and further including means for commanding the transport mechanism to transport the record medium at a single speed, means for detecting the address signals as the recording medium is transported, means for comparing the detected address signals to the address signal identifying the particular storage location, gate means coupled to said coupling means and responsive to said address comparator indicating the address signal of the particular storage location was detected to enable the pulses related to the unit length of the transported recording medium to be coupled to the counter for counting, further gate means coupled to said single-speed command means and responsive to said address comparator indicating the address signal of the particular storage location was detected to disable said single-speed command means, and means coupled to the address comparator means for reversing the direction of the transport of the recording medium after the address comparator means indicates the address signal of the selected storage location was detected, the count in the counter when the transport of the recording medium begins in the reverse direction is the initial count.

* * * * *